(12) United States Patent
Mitas et al.

(10) Patent No.: US 6,216,851 B1
(45) Date of Patent: Apr. 17, 2001

(54) RIVET BELT FASTENER

(75) Inventors: Gary Edward Mitas, Downers Grove; William Robert Wawczak, Glen Ellyn, both of IL (US); Thomas Stanley Wujek, Chittenango, NY (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 09/177,238

(22) Filed: Oct. 22, 1998

(51) Int. Cl.⁷ .................. B65G 17/00; F16G 3/00
(52) U.S. Cl. .................. 198/844.2; 24/31 H
(58) Field of Search .................. 198/844.2; 24/33 B, 24/31 H; 474/253, 255

(56) References Cited

U.S. PATENT DOCUMENTS

| | | | |
|---|---|---|---|
| 1,895,969 | * 1/1933 | Calhoun | 24/33 B |
| 3,913,180 | * 10/1975 | Pray | 24/33 B |
| 4,815,587 | 3/1989 | Musil . | |
| 5,182,933 | * 2/1993 | Schick | 24/33 B |
| 5,368,214 | 11/1994 | Schick . | |
| 5,531,012 | 7/1996 | Schick | 29/432.1 |
| 5,544,801 | 8/1996 | Schick . | |
| 5,553,359 | 9/1996 | Herold . | |

FOREIGN PATENT DOCUMENTS 9410  4/1919 (GB) .
612565  11/1948 (GB) .

* cited by examiner

Primary Examiner—Robert P. Olszewski
Assistant Examiner—Bryan Jaketic
(74) Attorney, Agent, or Firm—Fitch, Even, Tabin & Flannery

(57) ABSTRACT

A strip of riveted belt fasteners is provided manufactured in a punch press or the like to form multiple belt fasteners at a time with the fasteners each being attached to an end of a conveyor belt by way of a single rivet extending through single apertures in upper and lower plates of each of the fasteners. The small fasteners herein are provided with sufficient strength to be used in abusive hay baler applications while the fasteners must travel about small pulleys, e.g. 3" to 3.5" inches in diameter. Further, the installation of this rivet belt fastener in the field is about as simple as driving a nail requiring a portable applicator tool and a hammer. That is, the fasteners can be riveted attached to the belt end by way of a low cost applicator tool that includes recessed hardened anvil surfaces integrally formed in the body thereof to upset initially rivets which are driven through the belt with a separably attached pilot nail. The hollow rivet end flares out against the hardened anvil surfaces of the tool with the surfaces being inclined for curling of the rivet end back up into an enlarged recess in the overlying plate aperture. As the rivet is driven, the belt compresses with the rivet end being upset; and upon removal of the driving force, the belt decompresses to draw the curled, upset rivet end into the plate aperture.

15 Claims, 4 Drawing Sheets

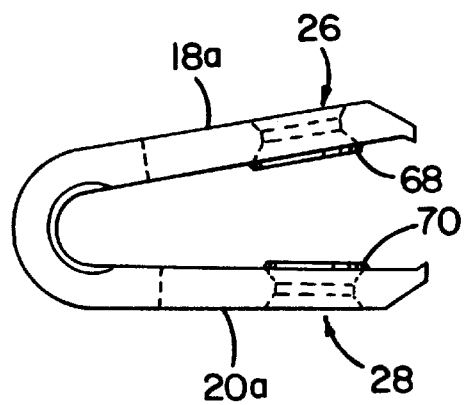
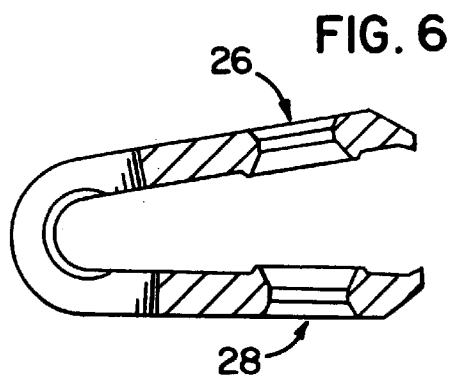
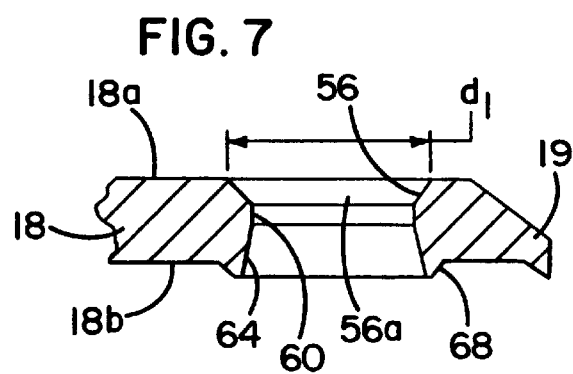
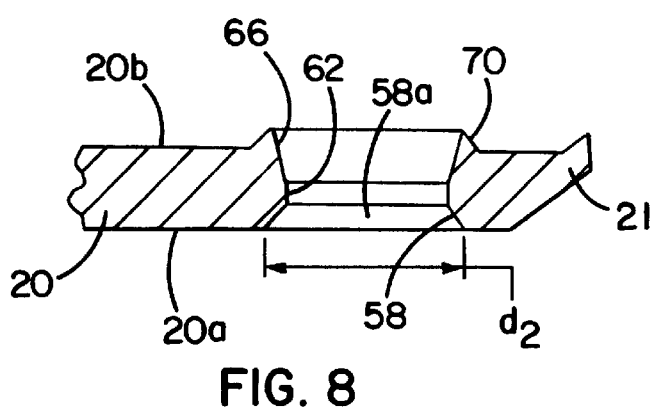
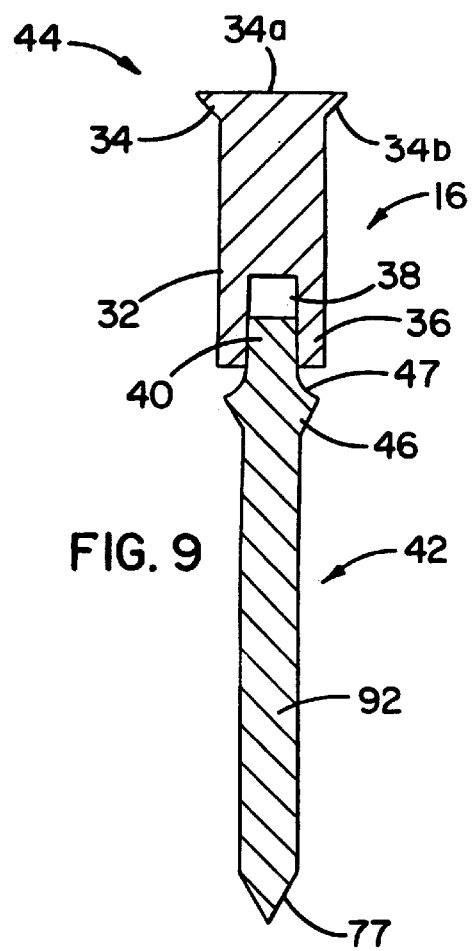

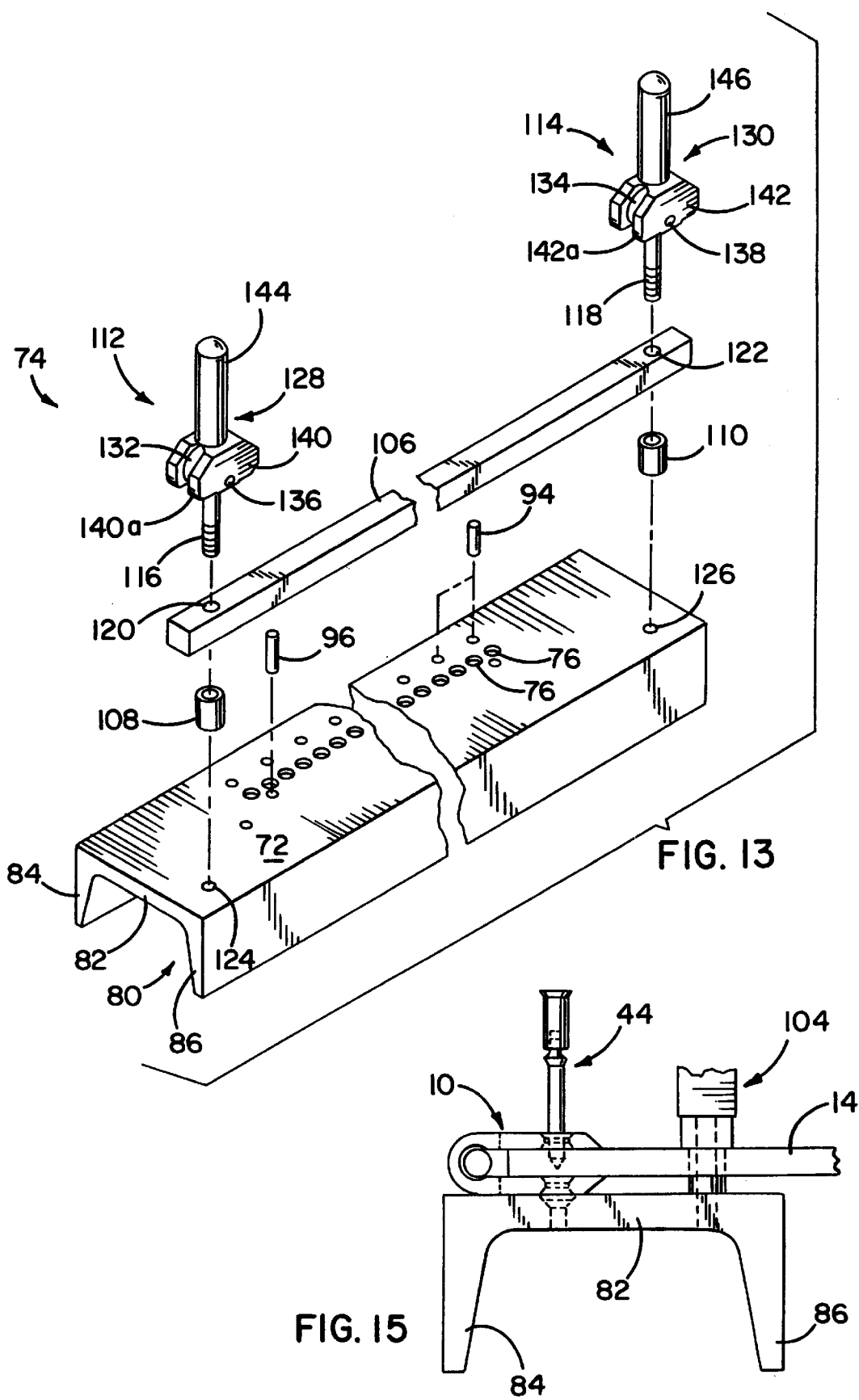

RIVET BELT FASTENER

FIELD OF THE INVENTION

The invention relates to a rivet belt fastener which is useful in splicing conveyor belts such as hay baler conveyor belts or the like and, more particularly, to a strip of stamped belt fasteners with each fastener in the strip including upper and lower plates attached to the belt by a single rivet.

BACKGROUND OF THE INVENTION

Mechanical belt fasteners are widely employed in a variety of belt conveying applications for splicing ends of conveyor belts together. One use of such belt fasteners is to splice conveyor belts for agricultural equipment such as round hay balers and net wrap hay balers. There are hinged fastener systems that have fasteners with upper and lower plates joined by arcuate loops. The plates have apertures therein with respective apertures in the upper and lower plates being aligned so that fastener members, e.g. rivets, staples, can be installed through the apertures and the belt for clamping the plates on the corresponding belt upper and lower surfaces. With the hinged fastener so attached, the loops project beyond the belt end for cooperating with the loops of similar fasteners attached on another belt end to form a passageway through the mating loops for receiving a hinge pin therethrough thereby hingedly connecting the belt ends together.

Although the rivet belt fastener of this invention may be made in various sizes and used in various applications, it is particularly useful for agricultural equipment such as hay balers where the splices are made with small belt fasteners. Small size belt fasteners are used to pass around small diameter pulleys e.g. 3 to 3.5 inches in diameter. Currently, one of the more widely used baler belt fasteners is secured with staples rather than rivets to secure the belt fasteners to the belt. A particular problem with these splices is the abusive operating conditions encountered and hence the need for a strong, long lasting splice, which preferably can be easily applied by the farm worker in the field when making repairs or new splices. The staple fastener tools currently in use to secure the staples into the belt are rather expensive and unwieldy for the farmer; and hence there is a need for a less expensive and simpler applicator tool for easy field installation of the belt fastener splice. Thus, there is a need for a new and inexpensive applicator tool for field installation of these small belt fasteners.

During operation of the spliced conveyor belts, the fasteners are subject to loads such as due to tension forces which, if sufficiently high, can cause the belt fasteners to fail. The strength required from a fastener to avoid such failures varies to a large extent based on the application involved and thus the belt utilized. Accordingly, with light and medium duty applications such as with conveyors for food and agricultural products, fasteners having strength ratings lower than that used in more heavy-duty applications such as in underground mines and aggregate plants, can be employed. Regardless, it is desirable to have the fastener provide the greatest strength possible for the particular conveyor application with which it is to be utilized without over design thereof such as by having extra large or thick plates and greater numbers of rivets, as this could unnecessarily drive up the costs associated therewith.

In addition to keeping the costs of the fastener material down, production costs also have to be controlled so as to provide lowest cost belt fastener possible to the end user without sacrificing performance. The production costs can get to be too expensive depending on how the fasteners are made, such as if they are each individually formed as by a forging process, see, e.g., U.S. Pat. No. 5,553,359 to Herold.

In the '359 patent, the individual belt fasteners are connected in a strip by a welded wire and attached to an end of a conveyor belt by a pair of solid rivets or pins that are staked at their ends by pointed punch tools to create enlarged rivet heads. The applicator tool of Herold has to form enlarged heads on both ends of a solid pin and the applicator tool used is both expensive and fairly difficult to use in the field. One problem with this solid rivet fastener is that the enlarged heads project beyond the plane of the fastener plates associated therewith. These projecting heads are subject to frictional forces by engagement with pulleys and belt cleaners and conveyed products and thus tend to abrade and wear away over time. This wearing away of the rivet heads accordingly reduces the strength of the fastener and can lead to premature failure thereof. A further problem relates to use in conveying agricultural products, and more particularly, wrapped bales of hay such as with netting material. In this instance, it is especially important for the fastener to have a smooth, low profile with no projecting portions that could catch or snag on the net wrapping about the bales. As is apparent, the projecting rivet pin ends of the '359 patent would not be desirable for this reason. Accordingly, a hinged rivet fastener with better formed rivet heads would be desirable.

The installation of riveted belt fasteners can be done with application tools such the MSRT and SRTA tools provided by applicants' assignee herein which are adapted to drive rivet and nail assemblies, such as disclosed in U.S. Pat. No. 3,990,343, through conveyor belts so as to upset the hollow end of the rivet attached to the nail for riveting the fasteners to the belt end. The tool employs a structural steel channel body mounting hardened bushings raised over the upper surface thereof for receiving the nails of the rivet and nail assemblies when driven. The hollow ends of the rivets are upset and spread outwardly by the enlarged head of the nail and in adjacent annular trough anvil surfaces of the bushings. The bushings also provide positioning for the fasteners by fitting the countersunk rivet apertures in the lower plate of each fastener thereover. Each of the hardened bushings adds significant expense to the tool, e.g. the hardened bushings may represent approximately 35 to 40 percent of the total cost for the tool making the tool expensive for farmers to use on a sporadic basis in the field. Accordingly, a belt fastening system, and more specifically an application tool, that is less expensive would be desirable.

SUMMARY OF THE INVENTION

In accordance with the present invention, a strip of riveted belt fasteners manufactured in a punch press or the like to form multiple belt fasteners at a time with the fasteners each being attached to an end of a conveyor belt by way of a single rivet extending through single apertures in upper and lower plates of each of the fasteners. As the fasteners are preferably joined integrally in a strip as formed by a progressive die stamping process, the fasteners do not have to be individually formed as by forging thus avoiding the increased cost associated therewith. The small fasteners herein are provided with sufficient strength to be used in abusive hay baler applications while the fasteners must travel about small pulleys, e.g. 3" to 3.5" inches in diameter. Further, the installation of this rivet belt fastener in the field is about as simple as driving a nail requiring a portable applicator tool and a hammer. That is, the fasteners can be rivet attached to the belt end by way of a low cost applicator tool that includes recessed hardened anvil surfaces integrally formed in the body thereof to upset initially rivets which are driven through the belt with a separably attached pilot nail. The hollow rivet end flares out against the hardened anvil surfaces of the tool with the surfaces being inclined for curling of the rivet end back up into an enlarged recess in the overlying plate aperture. Preferably, the size of the plate recess is coordinated with the tool recess for receiving the enlarged curled head of the rivet to provide for a good set of the rivet end in the recess.

In one form of the invention, a strip of riveted hinged fasteners for splicing ends of conveyor belts together is provided with the fasteners being joined together integrally in the strip and formed by a progressive die stamping process. Fasteners of the strip each have a pair of spaced plates connected by arcuate hinge loops which project beyond the belt end when the plates are riveted to the belt. A plurality of rivets each include a shaft and an enlarged head at one end of the shaft with a cylindrical wall portion at the other end for forming an upset head thereat to attach the plates to the belt. A single aperture is formed in each of the plates with the apertures of the plates of each of the fasteners generally being in alignment with each other when pressed against a conveyor belt for receiving the rivet therethrough. Each aperture incudes an enlarged recess to receive respectively the enlarged head and the upset head of the rivet. The present fastener strip provides a low cost, small fastener that has good strength characteristics by way of its single rivet attachment to a belt end.

Inclined surfaces extending about respective recesses are provided for receiving the enlarged and upset rivet heads tightly therein. In this manner, the inclined surfaces assist in providing the rivet with a good set in the plate apertures.

Preferably, the upset rivet head is seated in the aperture so that it is flush with or recessed below the plane of the associated plate. In this manner, the upset rivet head will not serve as a catching location such as for conveyed products, e.g. net wrapped bales.

The riveted belt fastener can be attached to belts which range in thickness, e.g. from 0.125" to 0.218" inch. Accordingly, the rivet hinged fasteners herein provide good flexibility in their application on different thicknesses of belts. The present fasteners will have more rivet metal curled for the thin belt than for the thicker belt, but in each instance there is a good curled head on the rivet.

In one form, the hinge loops of each of the fasteners include a pair of hinge loops symmetrically oriented about the apertures of the plates to equally share applied loads when the fasteners are riveted to the belt end.

Preferably, the plates and loops are of a substantially constant material thickness in cross-section.

In one form, the strip is provided in combination with a pilot nail at the cylindrical wall portion of each of the rivets, and an anvil including countersunk recesses each having a rivet end curling surface that are inclined to guide the rivet cylindrical wall portion for being curled up to be set in the overlying plate aperture.

Preferably, the plates of each fastener have a predetermined width and the apertures are generally circular in shape and have a diameter that is approximately half the width of the plate in which it is formed. In this manner, the size of the apertures is maximized relative to the amount of plate material thereabout so that the rivet heads can be larger for increasing the holding power of the riveted fasteners.

In another aspect of the invention, an easy to use applicator tool for riveting belt fasteners onto belt ends is provided and includes a body of high strength metal material with an upper support surface for resting the lower apertured plates of the fasteners thereon. Recesses are provided in the support surface with the apertures of the lower plates placed in overlying relation to the recesses for riveting of the fasteners onto a belt end. Inclined anvil surfaces of the recesses are hardened for resisting high impact forces as the rivets are driven through the belt end by a hammer and for causing an end of the rivet driven thereagainst to be upset and guided into the overlying lower plate aperture for setting therein. Thus, field installation can be made with this easy-to-use, inexpensive applicator tool and a hammer.

BRIEF DESCRIPTION OF THE DRAWINGS

FIG. 5 is a side elevational view of an individual fastener of the strip of fasteners of FIG. 1 showing upper and lower plates each having a single aperture formed therein that are generally aligned with each other for receiving a rivet therethrough;

FIG. 6 is a view similar to FIG. 5 taken partially in section through the apertures of the plates;

FIG. 7 is an enlarged fragmentary sectional view of the upper plate aperture taken along line 7—7 of FIG. 3;

FIG. 8 is an enlarged fragmentary sectional view of the lower plate aperture taken along line 8—8 of FIG. 3;

FIG. 9 is a cross-sectional view of a rivet and a pilot nail separably attached at a hollowed out end of the rivet for driving through the conveyor belt and setting of the rivet in the plate apertures of the fastener;

FIG. 13 is a perspective exploded view of an applicator tool that can be used for installing the single rivet, hinged belt fasteners herein showing a channel-shape body including a plurality of recesses in a support surface thereof above which the lower plate apertures of the fasteners are to be aligned;

FIG. 15 is a side elevational view of the installation process using the applicator tool of FIG. 13.

DETAILED DESCRIPTION OF THE PREFERRED EMBODIMENT

Figure 1:
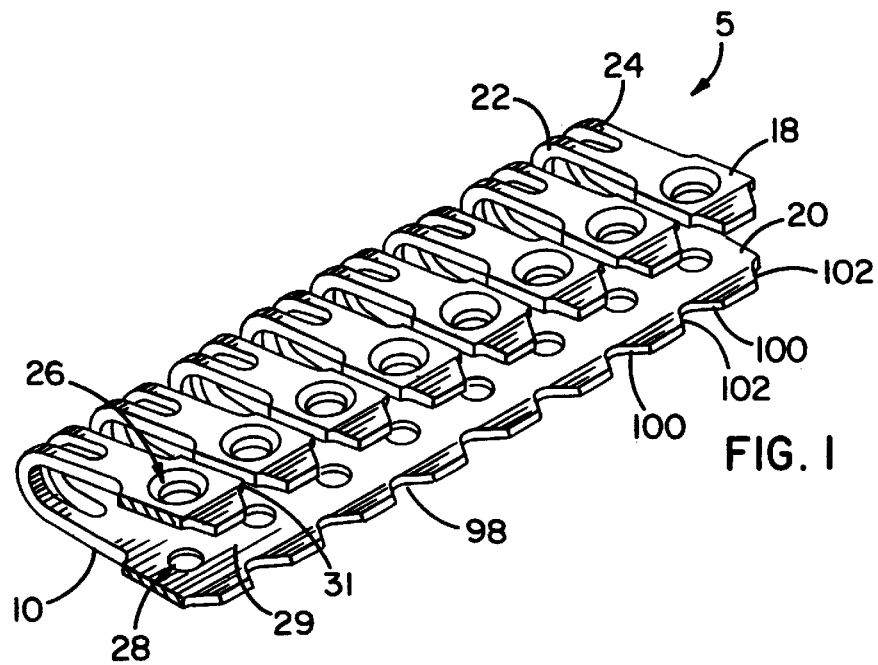
FIG. 1 is a perspective view of a strip of hinged fasteners that are integrally joined together in accordance with the present invention.
Figure 2:
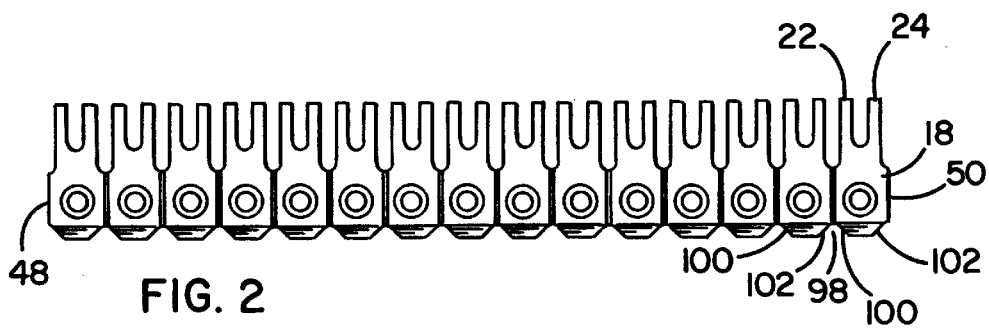
FIG. 2 is a plan view of the strip of fasteners of FIG. 1 showing a pair of arcuate hinge loops symmetrically oriented about a plate aperture of each fastener.
Figure 12:
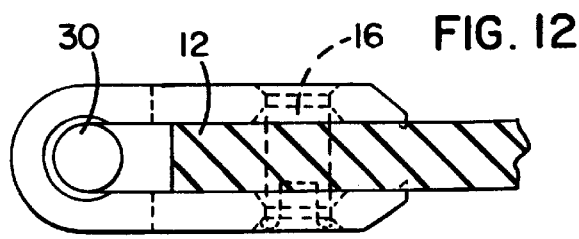
FIG. 12 is a side elevational view of an individual fastener riveted onto a belt end with the hinge pin installed through the arcuate loops thereof.

In FIGS. 1 and 2, a strip 5 of integrally joined hinged belt fasteners 10 is shown for being attached on end portions 12 of conveyor belts 14 each by a single rivet 16 (FIG. 12). In this regard, each of the fasteners 10 includes upper and lower plates 18 and 20 connected by arcuate hinge loops 22 and 24 with the plates 18 and 20 each including a single rivet receiving through aperture 26 and 28, respectively, formed therein. For being integrally connected together in the strip 5, between each adjacent pair of fasteners 10 is an integral bridging portion 29, as can best be seen in FIGS. 1 and 3. More specifically, the bridging portion 29 as shown spans between the lower plates 20 of adjacent fasteners 10 with there being a gap 31 between upper plates 18 of adjacent fasteners 10. The bridging portion 29 can be notched so that during conveyor operations, the fasteners 10 can separate from each other as by bending and breaking at the notched portion 29 therebetween.

Figures 3, 4:
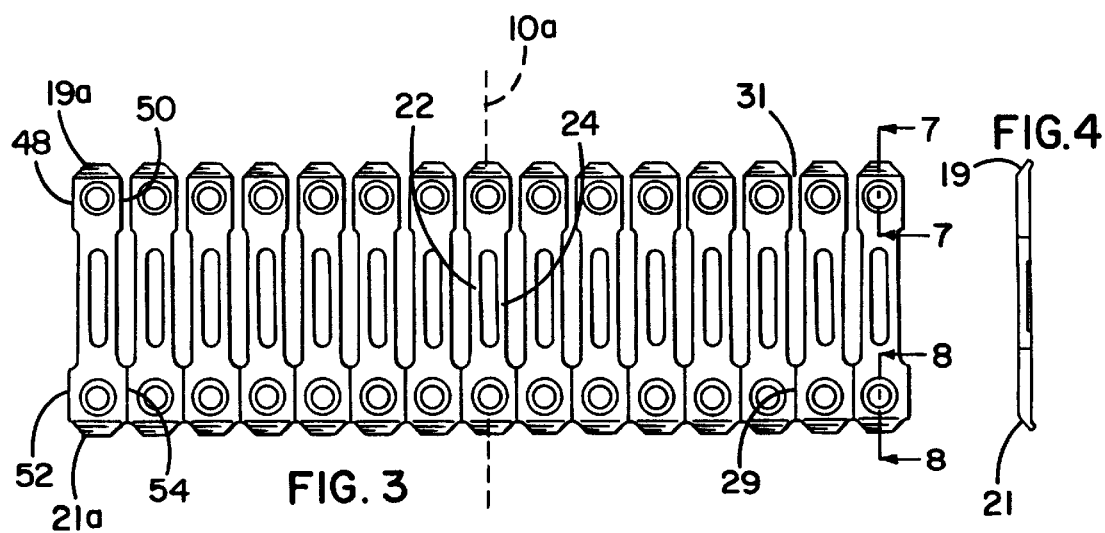
FIG. 3 is a plan view of the strip of fasteners formed by a progressive die stamping process before being bent and folded over into the form shown in FIG. 1.
FIG. 4 is a side elevational view of the strip of fasteners as shown in FIG. 3.

Preferably, the size of the apertures 26 and 28 relative to their respective plates 18 and 20 is maximized to allow large rivet heads to be set therein so as to assist in providing the fasteners 10 with a high PIW (pounds per inch of width) rating, e.g. 300 or greater, to provide a low cost, high strength fastener 10 good for use in agricultural and other light to medium duty conveyor belt applications. The fasteners 10 are of a high strength metal material such as a No. 304 stainless steel material and can be produced by starting with a strip of the stainless steel material and subjecting it to a progressive die stamping process in which various metal working stages occur such as punching and coining of the strip to produce a strip as shown in FIG. 3 before being bent and folded over into the FIG. 1 form for low cost, high-volume production of the fasteners 10 herein.

Referring to FIG. 12, when the fasteners are riveted onto belt end 12 they can be hingedly attached to another belt end with similar fasteners riveted thereon via hinge pin 30 inserted through mating loops of the respective fasteners. Accordingly, the engagement area between the pin 30 and the loops 22 and 24 can see significant tension forces during conveyor operations. Prior fasteners such as in the previously mentioned '359 patent individually form their fasteners so that their loops are thicker in cross-section than the fastener plates. As the present fasteners 10 are formed from stamped metal, the thickness of the plates 18 and 20 and the loops 22 and 24 are substantially constant except at the coined outboard edge portions 19 and 21 of the respective plates 18 and 20, as can be seen in FIG. 4. The coining of the edge portions 19 and 21 can be relatively sharp, i.e. approximately 30°, to provide a biting action into the belt 14 for improved holding power when the fastener 10 is riveted onto the belt 14. To obtain the thickness needed for strength in the loops 22 and 24, the metal stock strip from which the fasteners are formed is provided with the desired thickness, i.e. on the order of approximately 0.089 inch thick. The above thickness of the fasteners 10 is relatively large given the small size of the fasteners 10 herein, and has been found to provide the fasteners 10 with sufficient strength for the primary application for which they are designed, i.e. agricultural conveying systems such as for hay baling. In addition, the thicker plates 18 and 20 provide the fastener 10 with more metal that can be abraded during conveyor operations. In this manner, the fasteners 10 have improved wear resistance, and can maintain their strength sufficiently high over time to resist against premature failure thereof.

Another strength enhancing feature of the present fasteners 10 is the symmetrically oriented loops 22 and 24 at the rear of the plates 18 and 20. In typical hinged belt fasteners, the arcuate loops are offset to one side on the plates so that they can be mated with the projecting loops of an opposing fastener on another belt end while keeping the corresponding plates of the opposing fasteners in alignment with each other. Offset loops can create undesirable force imbalances in the fastener during conveyor operations. Accordingly, the present fasteners 10 have their loops 22 and 24 oriented symmetrically relative to the plates 18 and 20; that is, the loops 22 and 24 are equally spaced on either side of longitudinal axis 10a of the fastener 10, as can best be seen in FIG. 3. In addition, because the plates 18 and 20 include only single respective rivet apertures 26 and 28 that have a generally circular shape and are centered on the plates 18 and 20 so that their centers lie on the fastener axis 10a, the loops 22 and 24 are likewise symmetrically oriented about the apertures 26 and 28. With the symmetrical orientation of the loops 22 and 24 relative to the plates 18 and 20, as well as to the single apertures 26 and 28 therein, it has been found that the loops 22 and 24 will more equally share loads that are applied to the fastener 10 when riveted to the belt end 12 during operation of the spliced conveyor belt 14.

Although the belt fasteners 10 can be made in various sizes, the illustrated fasteners for use in hay balers are less than one inch in length to pass about the small diameter pulleys in a hay baler. The illustrated individual fasteners are only about 0.410 inch in width with apertures that are about 0.250 inch in diameter. Typically, the belt fasteners 10 are joined to each other in strips of predetermined length, e.g. seven and fourteen inch strips.

As previously-mentioned, in the hay baler application it is particularly important for the fasteners 10 to avoid catching on any wrapping of the bales, and thus the rivet heads should remain flush or recessed below the plane of the outer surface 18a or 20a of the apertures 26 and 28 of the plates 18 and 20 in which they are seated. It is further desirable that the rivet heads be formed so as to substantially fill the relatively large apertures 26 and 28 in the respective fastener plates 18 and 20 for maximum holding power of the fasteners 10 on the belt end 12.

The preferred rivets 16 that are to be used for attaching the fasteners 10 herein to belt ends 12 are provided with a rivet shaft 32 having an enlarged, preformed head 34 at one end and a cylindrical wall portion 36 at the other end of the shaft, as can be seen in FIG. 9. The cylindrical wall portion 36 provides a hollow cavity 38 in which an upper end 40 of a pilot nail 42 is received to form a rivet and nail assembly 44, as is known. The cylindrical wall 36 can be crimped so as to securely yet removably attach the nail end 40 to the rivet end 36 with an enlarged flanged head 46 of the nail 42 spaced slightly below the bottom of the rivet wall portion 36. The nail head 46 is provided with upper head or anvil surface 47 for deforming of the rivet end 36 during installation of the fastener 10, as will be more thoroughly described hereinafter.

As discussed, the apertures 26 and 28 are large relative to their respective plates 18 and 20. By way of example and not limitation, with the 0.089 inch thick stainless steel fastener 10, the upper plate 18 can have a width of 0.330 inch between sides 48 and 50 thereof, and the lower plate 20 can have a width of 0.410 inch between its sides 52 and 54, which due to the presence of bridging portion 29 can lie thereon. In the prebent form of FIGS. 3 and 4, the length of the fasteners 10 between outer edges of 19a and 21a of coined outboard edge portions 19 and 21 is approximately 2.0 inches. Referring to FIGS. 7 and 8, the diameter, $d_1$, of aperture 26 of the upper plate 18 along the upper plate surface 18a is approximately 0.250 inch, and the diameter, $d_2$, of the aperture 28 in plate 20 along surface 20a thereof is approximately 0.280 inch. As is evident, the apertures 26 and 28 are very large openings in the plates 18 and 20 with diameters $d_1$ and $d_2$ that are preferably at least half the width of the plates 18 and 20 and with the diameters $d_1$ and $d_2$ in the specific example set forth above being much greater than half the width of their respective plates which allows heads of the rivet 16 to likewise be large for improving the holding power of the fastener 10, as previously discussed.

With continuing reference to FIGS. 7 and 8, the configuration of the walls about the apertures 26 and 28 will next be more particularly described. As shown, the through apertures 26 and 28 extend from the outer surfaces 18a and 20a of the respective plates 18 and 20 to their inner surfaces 18b and 20b. These through apertures 26 and 28 are provided with various sections having different configurations including outer, intermediate, and inner sections. The outer sections of the apertures 26 and 28 extend from the respective outer diameters $d_1$ and $d_2$ at the plate surfaces 18a and 20a and taper inwardly to the intermediate sections by way of annular, inclined surfaces 56 and 58. The annular surfaces 56 and 58 extend about enlarged, countersunk recesses 56a and 58a of the apertures 26 and 28 for receiving the preformed head 34 and the upset head 36 of the rivet 16 therein. Inclined surface 56 serves as a seat for the preformed rivet head 34 when the fasteners 10 are installed on a belt end 12. In this regard, the head 34 is sized so that the diameter across the top surface 34a thereof is substantially the same or slightly less than diameter, $d_1$, across the inclined surface 56 along the plate upper surface 18a. The lower tapered surface 34b of the nail head 34 has an inclination substantially matching that of the inclined surface 56 for seating thereon. The inclined annular surface 58 can serve as a guiding surface for the deformed rivet end 36 as it is being upset and curled upwardly about the rivet shaft 32 for being set in the enlarged recess 58a in the aperture 28.

The inclined surfaces 56 and 58 have a frustoconical shape that extend annularly about enlarged countersunk recesses 56a and 58a in their respective apertures 26 and 28. At the inner end of the surfaces 56 and 58 are the respective intermediate sections of the apertures 26 and 28 including short straight, cylindrical wall surfaces 60 and 62 which each have a diameter slightly greater than that of the shank 32 of the rivet 16 so that it can be received therethrough. From the inner ends of the straight, cylindrical wall surfaces 60 and 62 are respective reverse tapered surfaces 64 and 66 of the inner section of the apertures 26 and 28 and which extend annularly and have a frustoconical shape with diameters at their innermost ends slightly less than the diameters $d_1$ and $d_2$. The reverse tapered surfaces 64 and 66 open to the area between the plates 18 and 20 at annular lips 68 and 70 that are raised from respective plate surfaces 18b and 20b.

Figure 10:
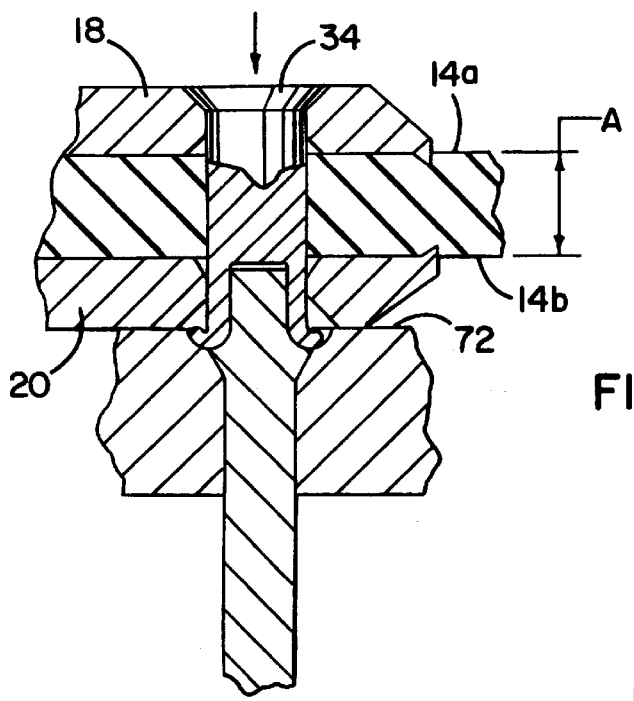
FIG. 10 is a cross-sectional view of the installation of the fastener on a belt end showing the rivet and nail being driven with the hollowed end of the rivet being upset along an inclined anvil surface.
Figure 11:
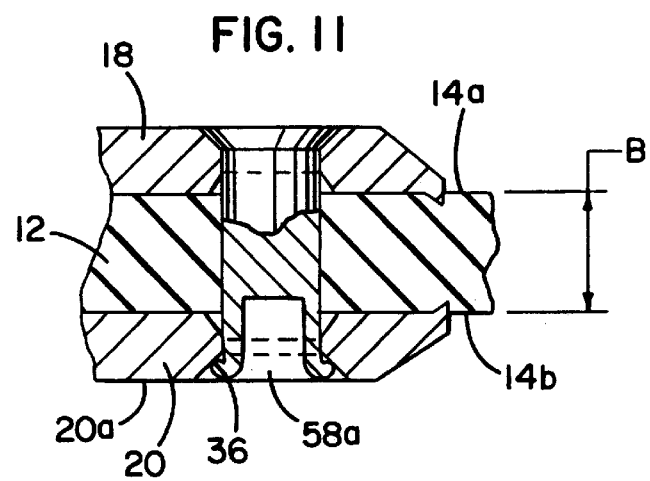
FIG. 11 is a view similar to FIG. 10 after the rivet has been set in the lower plate aperture showing the set, curled up rivet end in the lower plate aperture.

Installation of the fasteners 10 on a conveyor belt end 12 will next be described with reference to FIGS. 10 and 11. In FIG. 10, the fastener plates 18 and 20 are clamped tightly about the belt end portion 12 on respective upper and lower surfaces 14a and 14b of the conveyor belt 14 during riveting of the fastener 10 thereto. For installing the fasteners 10, the lower plate 20 can be supported on a support surface 72 of an installation tool such as applicator tool 74 (FIG. 13). Lower plate apertures 28 can be aligned over recesses 76 in the tool support surface 72 configured to upset the rivet end 36 of the rivet and nail assembly 44, as will be more fully described hereinafter. With the lower plate apertures 28 so aligned over the tool recesses 72, the rivet and nail assemblies 44 can be driven through the belt 14 as by hammer blows to the rivet head 34 with pointed leading end 77 of the pilot nail piercing the belt 14 and forming a pilot hole for the larger diameter rivet 16 thereover. Driving of the assembly 44 causes the rivet head 34 to enter the enlarged recess portion 56a of the aperture 26 as the rivet shank 32 is driven through the belt 14 with the rivet end 36 received in the aperture 28 and projecting out from the enlarged recess 58a thereof.

The belts 14 to which the present fasteners 10 are to be riveted are typically of a resilient material such as of an elastomeric or rubber material. Thus, with the nail head 46 engaging against abutment surface 78 in the recess 76 and the inclined surface 34b of the rivet head 34 seating against the recess inclined surface 56, continued hammer blows cause the plates 18 and 20 to compress the resilient material of the belt 14 therebetween with the rivet material at end 36 thereof deforming and flaring out as the bottom of the rivet end 36 is forced against the nail head anvil surface 47 so as to deform the end 36 radially outwardly, and then against anvil surface 88 of recess 76 shown in FIG. 14 to curl the end 36 up about the rivet shaft 32 for forming the upset rivet head. The annular surface 58 is coordinated in size with recesses 76 to receive the curled, upset rivet head.

After the curled rivet head 36 is formed, continued hammering can cause further shifting of the head 34 in upper plate aperture 26 so that the lower surface 34b of the head 34 seats tightly against inclined surfaces 56 therein. This shifting of the rivet head 34 in aperture 26 is sufficient so that it seats in recess 56a with its top surface 34a flush or recessed below plate outer surface 18a.

During driving of the assembly 44 to form the upset rivet head 36, the compressed belt 14 will have a reduced thickness, A, between the upper and lower surfaces 14a and 14b thereof as clamped by the fastener plates 18 and 20, as shown in FIG. 10. When the riveting of the fastener 10 to the belt 14 is complete and the driving force applied to the rivet 16 is removed, the material of the belt 14 will resiliently slightly expand between surfaces 14a and 14b thereof to a larger thickness, B, as shown in FIG. 11. It has been found that this belt expansion or decompression is sufficient to draw or pull the upset rivet head 36 into the enlarged recess 58a of the aperture 28. As shown, the rivet 16, and recesses 58a and 76 are preferably sized so that as the driving force is removed, the rivet head 36 will be substantially flush with or recessed slightly below the outer surface 20a of the lower plate 20 so that it does not present a catching location for conveyed products such as the wrapped hay bales previously discussed. In addition, the rivet 16 is sized so that the fastener 10 can be used on belts 14 which range in thickness by 0.094 inch. With the previous exemplary sizes, the fastener 10 can be utilized on belts 14 of thicknesses between 0.125 inch and 0.218 with the upset rivet head 36 increasing in size as the belt thickness decreases. For thinner belts, the anvil surface 88 will curl more metal for the upset rivet head than it does for the rivet piercing a thicker belt. This is advantageous in that it allows end users to reduce the number of different types of fasteners they keep in inventory for use on different sizes of belts.

As previously discussed, it is particularly important for the rivet head 36 to be provided with a good set in the aperture 28 and, in particular, so that the head 36 substantially fills in the countersunk recess 58a so that there is little or no loose play between the flared out and curled up rivet head 36 and the inclined surface 58 when the fastener 10 is riveted to the belt 14. For this purpose, application tool 74 can be utilized for riveting of the fastener 10 to the belt 14 with a plurality of the recesses 76 formed in a channel-shaped structural body member 80 of a case hardened steel material. No additional hardened bushing inserts for forming the upset rivet heads are required with the present tool 74 thus keeping its cost to a minimum. And because of the previously described compression and decompression of the belt 14 as the fasteners 10 are being installed, the upset rivet heads 36 will not protrude over the plane of the plate surface 20a despite being formed in recesses 76 of the tool 74.

Figure 14:
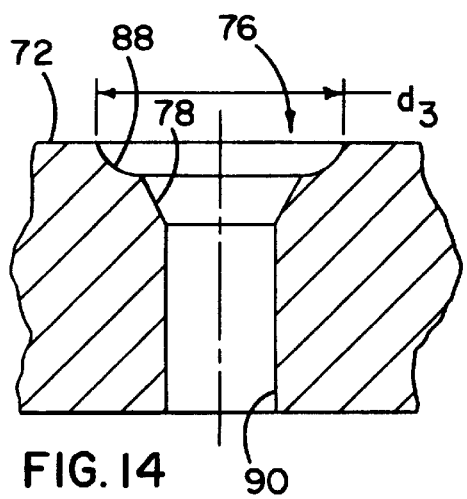
FIG. 14 is a sectional view showing the configuration of one of the recesses including an anvil surface for curling of the hollow rivet end and an abutment surface for the nail heads.

More specifically, web 82 of the channel body 80 has leg flanges 84 and 86 depending from either side thereof so that it can readily be transported to different conveyor belt locations so that the legs 84 and 86 rest on a support surface thereat with the working surface 72 of the channel web 82 raised thereabove. One of the recesses 76 formed in the web 82 is depicted in FIG. 14 and includes an inclined surface 88 which is disposed above the nail head abutment surface 78. The diameter, $d_3$, of the surface 88 along the tool support surface 72 is sized to be approximately the same or slightly smaller than diameter, $d_2$, of the inclined surface 58 of lower plate aperture 28. Accordingly, with the exemplary dimensions set forth earlier, the diameter, $d_3$, can be approximately 0.260 with the inclined surface 88 preferably extending arcuately therefrom to its innermost end at abutment surface 78 to a diameter of approximately 0.183 inch thereat. The preferred arcuate surface 88 has a radius of curvature of 0.052 inch with a vertical drop from web top surface 72 to the juncture with the abutment surface 78 of 0.0349 inch. The abutment surface 78 tapers inwardly to through opening 90 formed in the channel web 82 which has a diameter of approximately 0.125 inch.

Thus, when the rivet and nail assembly 44 is driven for riveting of the fastener 10 onto the belt 14, the nail shank 92 will project into through opening 90 with the nail head 46 engaging against abutment surface 78 so that nail head anvil surface 88 is circumscribed by arcuate inclined anvil surface 88 of the installation tool recess 76, as can be seen in FIG. 10. In this manner, the rivet end 36 is deformed and flared out by nail anvil surface 47 and then guided upwardly with continued driving of the rivet 16 by inclined anvil surface 88 in the recess 76 for being curled back upwardly about the rivet shaft 42. In addition, because of the close sizing of the diameters between the tool recesses 76 and the overlying plate recesses 58a, the inclined surfaces 58 in the lower plate apertures 28 also assists in providing the rivet head 36 with an improved set in enlarged recess 58a with the upset rivet head 36 engaged against or closely spaced from the surface 58.

Turning to the details of the construction of the installation tool 74, fastener position pins 94 and 96 are attached to the channel web 82 projecting upwardly therefrom for locating the fasteners 10 so that their lower plate apertures 28 are in overlying relation to the tool recesses 76. The pins 94 are aligned with the recesses 76 and can be provided at every other recess. Accordingly, the pins 94 can be fit between the hinge loops 22 and 24 symmetrically oriented about the plate apertures 26 and 28 of every other fastener 10 in the strip 5. Further, the aligned pins 94 are spaced at a predetermined distance from the recesses 76, e.g. 1.00 inch, so as to serve as a belt stop to locate the belt end 12 in proper position between the plates 18 and 20. On the other side of the row of recesses 76, there are two positioning pins 96 located offset from the last pair of recesses 76 at either end of the row of recesses 76 to fit between the last pair of lower plates 20 of adjacent fasteners 10 at either end of the fastener strip 5. The pins 96 fit in spaces 98 between adjacent lower plates 20 formed by beveling of the corners 100 and 102 of the fastener plates 18 and 20 at the respective outboard edge portions 19 and 20 thereof (FIGS. 1 and 2).

The tool 74 further includes a belt clamp 104 for securely clamping the belt 14 against the support surface 72 with end 12 thereof disposed in position between unclenched upper and lower plates 18 and 20 of the fastener strip 5. The belt clamp 104 can include an elongate clamp bar 106 mounted on channel member 80 via cylindrical compression springs 108 and 110 at either end thereof for biasing the clamp bar 106 upwardly relative to the channel web 82 to allow a belt 14 to be slid thereunder onto surface 72.

Overcenter cam lock clamps 112 and 114 are provided and include threaded mounting posts 116 and 118 which are inserted through openings 120 and 122 at either end of the bar 106 aligned over the cylindrical compression springs 108 and 110 which, in turn, are placed over internally threaded apertures 124 and 126 in channel web 82 so that the post 116 and 118 can be threaded therein with the compression springs 108 and 110 disposed between the clamp bar 106 and base upper surface 72. Over center clamps 112 and 114 each include a cam lever member 128 and 130 that are pivotally attached to enlarged fixed heads 132 and 134 at the upper ends of respective posts 116 and 118 by pivot pins 136 and 138, respectively.

The pivot pins 136 and 138 extend through a yoke-shaped cam portion 140 and 142 of the cam lever member 128 and 130 and through mounting post heads 132 and 134 for pivoting of the cam portions 140 and 142 thereabout. Handle portions 144 and 146 project upward from the respective cam portions 140 and 142 of the cam lever members 128 and 130. The cam portions 140 and 142 are provided with a contoured outer surface 140a and 142a so that when an operator pulls down on the handles 144 and 146 to pivot the cams 140 and 142 about their respective pivot pins 136 and 138, the contoured surfaces 140a and 142a will cam against the clamp bar 106 forcing it downwardly against the bias provided by compression springs 108 and 110 and shifting into a locking positions when the handles 144 and 146 are pivoted through an angle of approximately ninety degrees so as to securely clamp the belt 14 between the bar 106 and the support surface 72 of the tool body 80. With the belt 14 securely clamped by the belt clamp 104 of the tool 74 and the fastener strip 5 properly aligned relative to the tool recesses 76, the fasteners 10 can be installed on the belt 14 in a relatively simple manner by subjecting the rivet and nail assemblies 44 to hammer blows for riveting the fastener 10 onto the belt end 12, as previously described.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A strip of riveted hinged fasteners for splicing ends of conveyor belts together, the fasteners being joined together integrally in the strip and formed by a progressive die stamping process, the belt fastener strip comprising:

each of the fasteners of the strip having a pair of spaced plates connected by arcuate hinge loops which project beyond the belt end when the plates are riveted to the belt;

a plurality of rivets each having a shaft and an enlarged head at one end of the shaft;

a cylindrical wall portion at the other end of the rivet shaft for forming an integral upset head thereat to permanently attach the plates to the belt;

a single aperture in each of the plates with the apertures of the plates of each of the fasteners generally being in alignment with each other when pressed against a conveyor belt for receiving the rivets therethrough; and an enlarged recess in each aperture maximized in size relative to the plates and including surfaces thereabout to receive in substantial engagement therewith respectively the enlarged head of the rivet and the integral upset head.

2. The belt fastener strip of claim 1 wherein the aperture surfaces are inclined surfaces extending about the respective recesses for receiving the enlarged and upset heads of the rivet tightly therein.

3. The belt fastener strip of claim 1 wherein the upset rivet head is seated in the aperture so that it is flush with or recessed below the plane of the associated plate.

4. The belt fastener strip of claim 1 wherein the rivet is sized to allow the plates to be attached on belts which range in thickness by 0.094 inch.

5. The belt fastener strip of claim 1 wherein the hinge loops of each of the fasteners comprise a pair of hinge loops symmetrically oriented about the apertures in the plates to equally share applied loads when the fastener is riveted to the belt end.

6. A strip of riveted hinged fasteners for splicing ends of conveyor belts together, the fasteners being joined together integrally in the strip and formed by a progressive die stamping process, the belt fastener strip comprising:

each of the fasteners of the strip having a pair of spaced plates connected by arcuate hinge loops which project beyond the belt end when the plates are riveted to the belt;

a plurality of rivets each having a shaft and an enlarged head at one end of the shaft;

a cylindrical wall portion at the other end of the rivet shaft for forming an upset head thereat to attach the plates to the belt;

a single aperture in each of the plates with the apertures of the plates of each of the fasteners generally being in alignment with each other when pressed against a conveyor belt for receiving the rivets therethrough; and an enlarged recess in each aperture to receive respectively the enlarged head of the rivet and the upset head, wherein the plates and loops are of a substantially constant material thickness in cross-section.

7. The belt fastener strip of claim 1 in combination with a pilot nail at the cylindrical wall portion of each of the rivets, and an anvil including countersunk recesses each having a rivet end curling surface that are inclined to guide the rivet cylindrical wall portion for being curled up and into the overlying plate aperture.

8. A strip of riveted hinged fasteners for splicing ends of conveyor belts together, the fasteners being joined together integrally in the strip and formed by a progressive die stamping process, the belt fastener strip comprising:

each of the fasteners of the strip having a pair of spaced plates connected by arcuate hinge loops which project beyond the belt end when the plates are riveted to the belt;

a plurality of rivets each having a shaft and an enlarged head at one end of the shaft;

a cylindrical wall portion at the other end of the rivet shaft for forming an upset head thereat to attach the plates to the belt;

a single aperture in each of the plates with the apertures of the plates of each of the fasteners generally being in alignment with each other when pressed against a conveyor belt for receiving the rivets therethrough; and an enlarged recess in each aperture to receive respectively the enlarged head of the rivet and the upset head, wherein the plates of each fastener have a predetermined width and the apertures are generally circular in shape and have a diameter that is approximately half the width of the plate in which it is formed.

9. A strip of constant thickness belt fasteners for being riveted onto a belt end for splicing belt ends together, the belt fastener strip comprising:

a plurality of adjacent, joined belt fasteners;

a pair of spaced plates on each belt fastener of a metal material and connected by arcuate hinge loops with the plates and loops having a substantially constant material thickness in cross-section;

the spaced plates having a predetermined width;

a single aperture in each of the plates that are generally aligned when the belt fastener is applied to a belt for receiving the rivet therethrough;

the diameter of single aperture being about one half of the width of the plate; and edges of the plate closely spaced about the aperture to maximize the size of the aperture relative to the amount of plate material thereabout allowing the size of the rivet heads to be increased for increasing the holding power of the rivet.

10. The belt fastener strip of claim 9 wherein one of the plates includes a bridging portion integrally attached to another identical fastener.

11. The belt fastener strip of claim 9 wherein the hinge loops comprise a pair of hinge loops symmetrically oriented about the single aperture in the plates to equally share applied loads when the fastener is riveted on the belt end.

12. The belt fastener strip of claim 9 wherein one of the rivet heads is formed by providing a cylindrical wall portion at one end of the rivet that is upset and curled into the associated aperture.

13. The belt fastener strip of claim 9 wherein the rivet heads are flush with or recessed below the plane of their respective plates.

14. A small, high strength hinged fastener for being attached to ends of conveyor belts to splice the belt ends together, the fastener comprising;

a pair of spaced plates for engaging against opposite surfaces at a belt end, each of the plates extending along a longitudinal axis of the fastener; and a pair of long arcuate hinge loops connecting the plates spaced symmetrically from each other about the longitudinal axis, the loops extending for a relatively long axial distance which is only slightly less than the axial distance the plates extend, the plates and hinge loops having a substantially constant material thickness in cross-section that is relatively large compared to an overall length of the fastener plates and loops that is short so that the fastener is a relatively small, thick fastener for travel over small pulley diameters and which provides strong splices on belt ends.

15. The fastener of claim 14 including a rivet for permanently attaching the plates to opposite belt surfaces; and a single large aperture in each of the plates centered on the fastener axis for receiving heads of the rivet therein with surfaces in the apertures serving as seats for the heads so that both of the rivet heads are in substantial engagement with the seating surfaces in the respective plate apertures.

* * * * *